United States Patent [19]

Dorsey

[11] Patent Number: 4,790,104
[45] Date of Patent: Dec. 13, 1988

[54] LINE ATTACHMENT DEVICE

[76] Inventor: Harris J. Dorsey, 1917 Stella Cir., Port Neches, Tex. 77651

[21] Appl. No.: 133,186

[22] Filed: Dec. 14, 1987

Related U.S. Application Data

[63] Continuation of Ser. No. 860,049, May 6, 1986, abandoned, which is a continuation-in-part of Ser. No. 756,718, Jul. 19, 1985, abandoned.

[51] Int. Cl.⁴ ............................................. A01K 91/04
[52] U.S. Cl. ................................. 43/44.85; 24/129 B; 24/129 C
[58] Field of Search ............... 24/128, 129 R, 129 B, 24/129 C, 129 W, 130, 547; 43/44.85

[56] References Cited

U.S. PATENT DOCUMENTS

| 348,871 | 9/1886 | Wales | 24/129 B |
|---|---|---|---|
| 363,495 | 5/1887 | Wilson | 24/130 |
| 500,365 | 6/1893 | Berbecker | 24/130 X |
| 536,031 | 3/1895 | Hood | 24/130 X |
| 763,303 | 6/1904 | Mayers | 24/547 |
| 764,719 | 7/1904 | Gorton | 24/547 |
| 1,198,954 | 9/1916 | Reinelt | 24/130 |
| 1,228,019 | 5/1917 | Hancock | 24/129 R |
| 2,052,887 | 9/1936 | Lewis | 24/547 |
| 2,543,207 | 2/1951 | Taggart | 24/533 X |
| 2,623,477 | 12/1952 | Tuttle | 24/130 X |
| 3,069,802 | 12/1962 | Olsen | 43/44.95 |
| 3,176,873 | 4/1965 | Montgomery | 24/130 X |
| 3,205,544 | 9/1965 | Streule et al. | 24/72.7 X |

FOREIGN PATENT DOCUMENTS 1370710  7/1964  France ............................... 43/44.84

Primary Examiner—Nicholas P. Godici
Assistant Examiner—Carmine Cuda
Attorney, Agent, or Firm—Vaden, Eickenroht, Thompson & Boulware

[57] ABSTRACT

There is disclosed fishing gear which includes a device for suspending an object, such as fish hook, weight or chum basket, from a trot line, wherein the chum basket is made up of molded plastic body sections secured to one another at their enlarged ends.

5 Claims, 2 Drawing Sheets

U.S. Patent  Dec. 13, 1988  Sheet 1 of 2  4,790,104
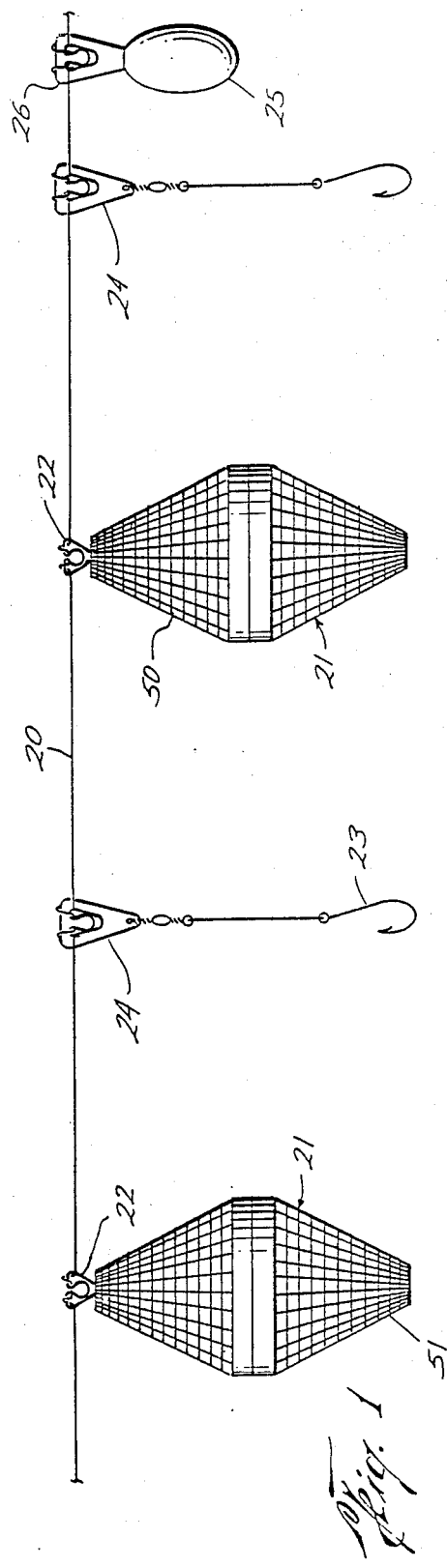
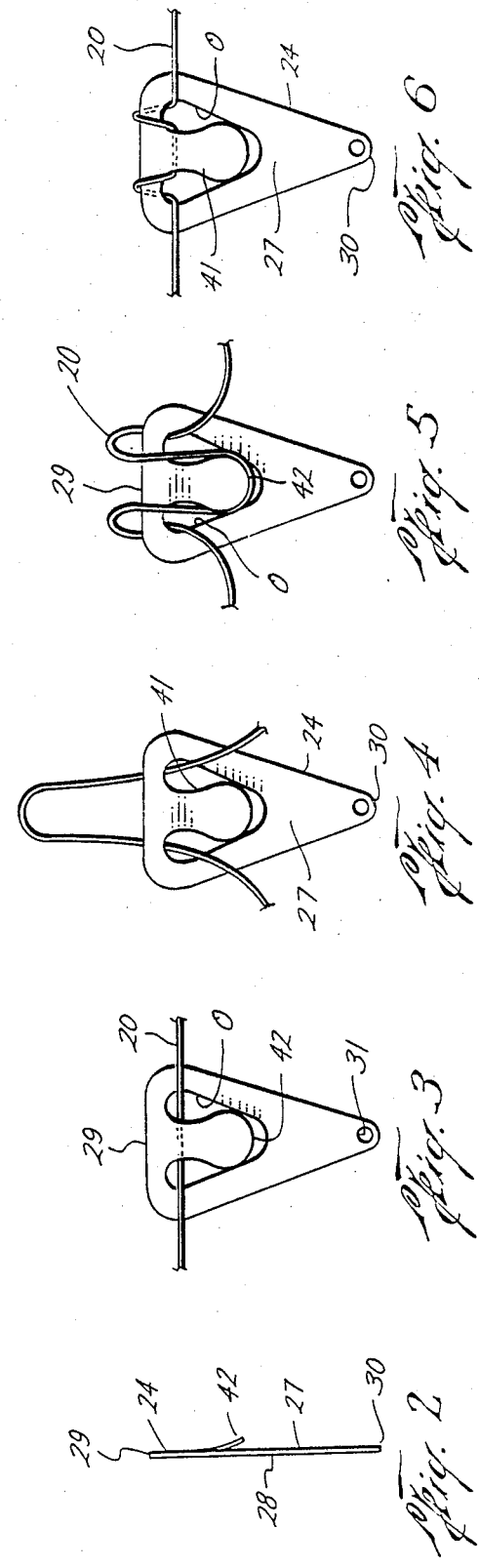

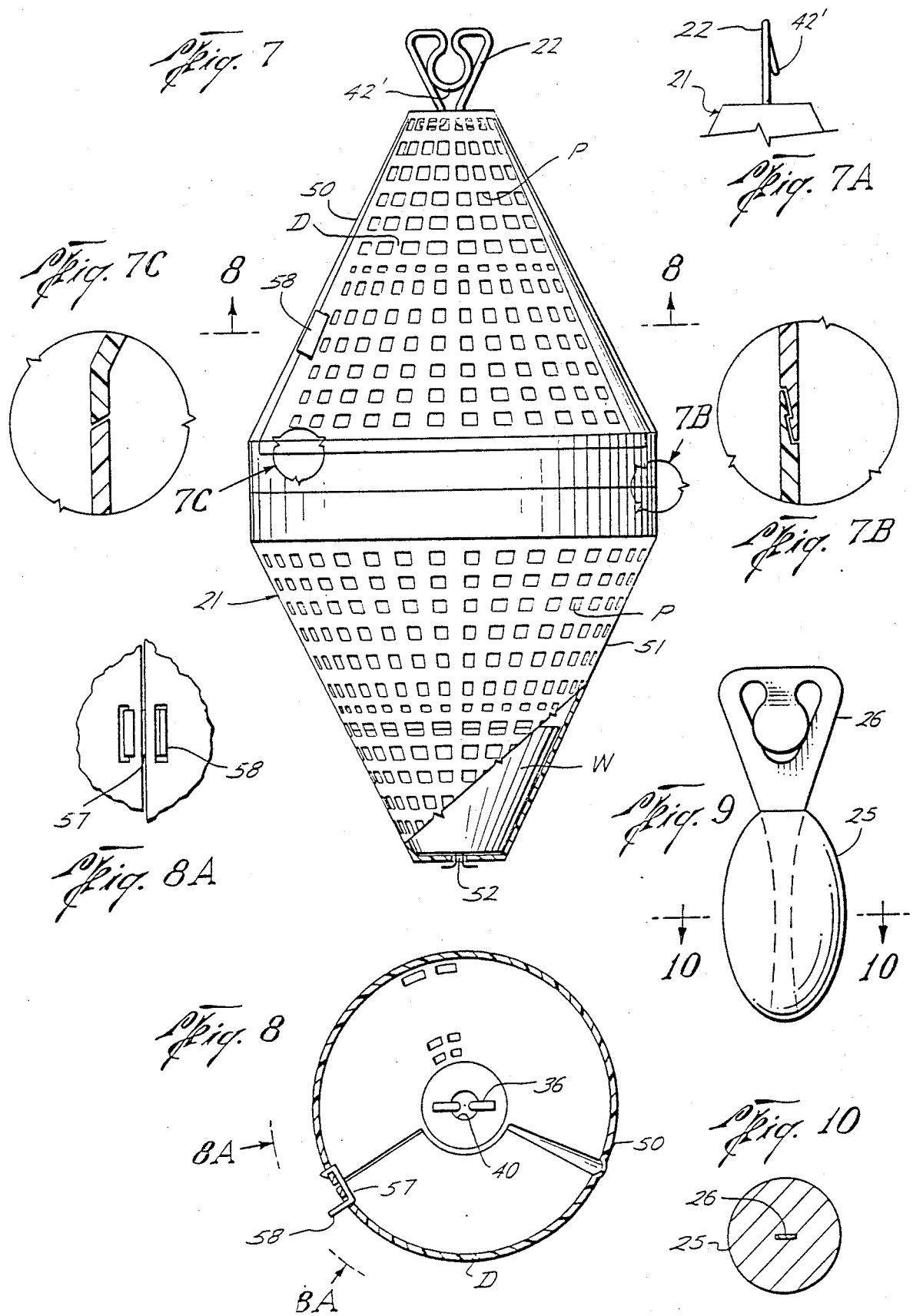

LINE ATTACHMENT DEVICE

This application is a continuation of application Ser. No. 860,049, filed May 6, 1986, now abandoned, which in turn is a continuation-in-part of Ser. No. 756,718, filed July 19, 1985, now abandoned.

This invention relates generally to fishing gear. In one of its novel aspects, it relates to an improved device for suspending an object from a trot line. In another of it novel aspects, it relates to an improved chum basket.

As well known in the art, a trot line is made up of a string or other flexible line which is stretched across a narrow body of water and from which objects such as hooks, weights and/or chum baskets are suspended beneath the water surface. As also well known in the art, a chum basket comprises a container for fish food which of such construction that the food is automatically dispensed therefrom as the container moves in the water, upon contact by a fish, due to water currents, or when induced by the fisherman.

Ordinarily, objects to be suspended from the line are attached thereto by devices which are preassembled on the line, and/or which are difficult to attach thereto and detach therefrom. It is an object of this invention to provide a simple, inexpensive device by means of which these or other objects may be quickly and easily attached to or detached from selected locations along a trot line or the line.

Containers often used as chum baskets are of relatively heavy and expensive construction, and are not particularly well suited for stocking with fish food. It is another object of this invention to provide a chum basket which is of light weight, inexpensive construction and which may be easily and quickly stocked.

The first mentioned object is accomplished, in accordance with the illustrated embodiments of the present invention, by a device which comprises a thin, relatively rigid body having front and back faces, an upper end, and a lower end from which the object may be suspended, the body having a substantially "U" shaped opening formed therein with legs which extend along opposite sides of a depending tongue, and a flap on the lower end of the tongue which projects outwardlyl from the front face of the body. The side edges of the flap are relatively close to the adjacent side edges of the opening, so that when the device is to be used for suspending an object from the line, the line is tightly engaged therebetween as it is moved over the front face of the body and under the flap to a position behind the upper end of the tongue. The back face of the upper end of the tongue is substantially coplanar with the back face of the body on opposite sides of the tongue, so that the line is easily grasped to permit it to be pulled upwardly to form a loop, above the upper end of the body which may then be bent over the upper end and across the front face of the body on opposite sides and below the flap of the tongue, whereupon the line may be moved under the flap and then returned to a position behind the tongue as tension is applied to its opposite ends. The legs of the openings and the adjacent side edges of the upper end of the tongue are spaced apart sufficiently to permit the line to be pulled upwardly within the legs to a position adjacent the portions of the line initially pulled upwardly behind the tongue. As long as the line remains relatively taut, the device is held against movement from the selected location along the length of the line. Preferably, the portions of the front face of the body on opposite sides of the flap are generally flat so that the line may be moved beneath the flap while in a taut condition.

In one embodiment of the invention, the body of the device has means on its lower end to which an object may be removably attached. This object may, for example, be a chum basket or a leader and fish hook. Alternatively, the object may comprise a weight which is fixedly secured to the lower end of the body. In one embodiment of the invention, the body is made of sheet metal, and, in another embodiment, the body is made of bent wire.

In accordance with the second mentioned object of the invention, the chum basket comprises an elongate body having generally frusto-conically shaped sections which are joined at their larger ends and which have perforations in their side walls, means on the upper section by which the body may be suspended in the water, and a weight in the lower section to cause the body to assume a vertical position generally axially of its sections, whereby vertical movement of the body causes water to circulate through its perforations in order to dispense particles of food therefrom. More particularly, the upper section has a door in its side to permit access to the interior of the body, and thus permit it to be filled with food without the necessity of disconnecting the sections from one another or otherwise altering the integrity of the overall body.

In the drawings, wherein like reference characters are used throughout to designate like parts:

FIG. 1 is a elevational view of a series of objects suspended at selected locations along the length of a trot line by means of devices constructed in accordance with the present invention;

FIG. 2 is a side view of one embodiment of such device shown in FIG. 1 for suspending a leader and fish hook there from;

FIGS. 3 to 6 are front views of the device of FIG. 2, showing the sequential steps by which it is attached at a selected location along the length of the line;

FIG. 7 is an elevational view of the side of a chum basket constructed in accordance with the present invention, and suspended from the trot line by another embodiment of the device shown in FIG. 1, and broken away in part to show a weight in its lower end;

FIG. 7A is a side view of the device by which the chum basket is suspended from the trot line, as shown in FIG. 7;

FIG. 7B is a detailed, enlarged sectional view of a portion of the adjoining edges of the enlarged ends of body sections of the chum basket;

FIG. 7C is an enlarged, detailed sectional view of the adjacent edges of the door and door opening formed in the upper body section of chum basket;

FIG. 8 is a horizontal sectional view of the upper body section of the chum basket, as seen along broken lines 8—8 of FIG. 7, and showing a latch which releasably secures the door to the door opening in the upper section;

FIG. 8A is a detailed, front view of of the latch;

FIG. 9 is an enlarged, front elevational view of the device shown in FIG. 1 for suspending a weight from the trot line; and FIG. 10 is a horizontal sectional view through the lower end of the device of FIG. 9 and the weight secured thereto.

With reference now to the details of the above described drawings, the trot line 20 shown in FIG. 1 is made of string or other flexible line adapted to have its opposite ends (not shown) anchored to opposite sides of a relatively narrow body of water to suspend various objects in the water. Chum baskets 21 are suspended from the line by means of devices 22 while leaders and fish hooks 23 are suspended therefrom by means of devices 24. Also, a lead weight 25 is secured to a device 26 having an upper end similar to devices 24 for attachment to the line suspending the weight.

As best shown in FIGS. 2-6, the device 24 comprises a relatively thin, flat body of sheet metal which has front and rear faces 27 and 28, an upper end 29, and a lower end 30 from which an object may be suspended. As shown the object, a leader from which a fish hook 23 is suspended is releasably attached to a hole 31 in the lower end of the body.

The device 22, which is shown in detail in FIGS. 7 and 7A, also comprises a thin, relatively rigid body having front and back faces, an upper end, and a lower end from which an object, such as the chum basket 21 may be suspended. In this case, however, the body is made of bent wire having free ends which extend outwardly at the lower end of the body to provide a means by which the upper body section of the chum basket may be attached thereto. Thus, as shown in FIG. 8, the free ends may be compressed toward one another to a position in which they may be moved through a hole 40 in the upper end of the upper body section of the chum basket, and then released to permit the free ends to move underneath the upper end of the upper body section and opposite side of the hole.

The device 26 is similar in construction to the device 24 in that it is made of a thin, relatively rigid body of sheet metal having front and rear faces, upper and lower ends. In this case, however, an object in the form of a lead weight 25 is secured to a vertically extended lower end of the body of the device so as to enable it to be suspended from the trot line.

As shown, each of the devices has a substantially "U" shaped opening "O" formed therein with legs which extend along opposite sides of a depending tongue 41, and a flap 42 on the lower end of the tongue which projects outwardly from the front face of the body. In the device 24, the opening is cut from the sheet metal, and the flap is bent outwardly from the lower end of the tongue, so that, as shown, in FIG. 2, the inner edge of the lower end of the flap extends from the front face 27 of the body so that the line 20 may be moved to a position beneath the lower end of the flap, as will be described to follow. More particularly, and as shown, the portions of the front face of the body on opposite sides of the flap are flat so that the lower end of the flap may be moved easily over a taut line.

In the device 22, the "U" shaped opening "O" is formed between inner portions of a loop of the bent wire which form the tongue 41 and laterally opposite outer portions whose lower ends are bent inwardly. The flap 42' is formed by a bent portion of the lower end of the loop forming the tongue of the device. Thus, as will be apparent from FIG. 7A, the flap projects from the front face of the device 22 in the same manner and for the same purposes described above in connection with the device 24.

In each device, the corners of the "U" shaped opening preferably form a slight restriction between the side edges of the flap and the adjacent side edges of the legs of the opening which is smaller than the thickness of the line. Thus, as shown sequentially in FIGS. 3 to 6, in attaching the device 24 to the line 20, a taut section of the line is tightly engaged as it is moved upwardly beneath the flap into a position behind the upper end of the tongue, as shown in FIG. 2. In fact, the adjacent side edges of the flap may engage the adjacent edges of the opening so that the flap is flexed slightly outwardly to pass the line. Thus, the device is prevented from accidental displacement from the line in the event, for example, the line becomes slack.

Then, as shown in FIG. 4, the portion of the line behind the tongue is grasped and raised to form a loop extending upwardly above the upper end of the device a distance which, as indicated in FIG. 5, permits the loop to be folded downwardly over the upper end of the device and to a position across the front face of body of the device in which the lower end of the loop is beneath the flap on the lower end of the tongue. At this time, and with the end of the loop maintained close to the front face of the body of the device, the line may be retightened to cause the end of the loop to move under the flap to a position behind the tongue. As shown in FIG. 6, the portion of the line behind the upper end of the tongue is connected to its free ends by loops which extend tightly over the the upper end of the body, so that as long as the line is maintained substantially taut, the device will be held in fixed position along the length of the line. As shown, the spaces between the upper ends of the tongue and the upper ends of the legs of the opening are wide enough to receive both turns of the line without binding.

Despite differences in construction, as previously described, it will be understood that each of the devices 22 and 26 will be attached to a line in the same manner. It will also be understood that the device may be detached from the line by a reversal of the steps described in connection with FIGS. 3 to 6. Also, the back side of the upper end of the tongue and the portions of the back side of the body of the device on opposite sides of the upper end of the tongue are coplaner so as that the line on the back side of the tongue, as shown in broken lines in FIG. 6, is easily grasped to permit removal of the device from the line. Alternatively, it may be moved to a different longitudinal position along the line by relaxation of the tautness in the line sufficiently to relieve the bight of the bent portions of the line with the front and back faces of the body of the device.

As shown, the chum basket 21 is made up of upper and lower generally frusto-conically shaped sections 50 and 51 of suitable plastic material which having perforations P in their sides and are joined at their large ends. To facilitate joinder, these large ends have cylindrical portions which may be releasably secured to one another by the interlocking edges shown in FIG. 7B. As will be appreciated, the large ends of each of the body sections are flexible to permit them to be moved quickly into interlockign relation, and then released from interlocking relation by depression of the flexible portion which is on the inner side of the joint.

Each body section also has a flat portion at its smaller end which may be imperforate except for central holes. As previously described, the hole 40 in the upper end of the upper body section 50 receives the outwardly bent free ends 36 of the device 22 to permit the device to be attached to and detached from the chum basket. The hole 52 in the lower end of the lower body section, on the other hand, receives wires on the lower end of the weight "W" mounted within the lower end of the body section 51 so as to releasably hold it in place. As previously described, the weight, which may be of lead and is shaped to fit the end of the lower basket, will normally maintain the body of the chum basket in a vertical direction, so that when it is caused to bob up and down, water circulates through its perforations and thus agitates the fish food contained therein sufficiently to cause particles of it to be dispensed through the perforations.

As shown, each of the upper and lower body sections 50 and 51 is of the same shape so that each may be fabricated in the same mold. The body sections differ, however, in that the upper section 50 has an opening in its side which is opened and closed by a door D to permit access to the interior of the basket for stocking it with fish food. Thus, upon molding of the upper body section 50, the door may be cut therefrom, and then hingedly mounted to one side of the opening, as shown in FIG. 8

The door extends vertically throughout much of the length of the upper body section, and, as shown FIG. 8, may extend angularly about approximately one-third of the circumference of the body section. The door is releasably held in closed position by means of a latch 57 comprising a "U" shaped element mounted at one end on a portion of the body section adjacent the door opening, a having a free end 58 which extends laterally over the inside of the adjacent portions of the door opening and one edge of the door, and then projects through a slot in the door to provide a part which may be depressed inwardly in order to release the door for opening. The opposite vertical edge of the door is suitably hinged to the adjacent door opening, as by means a molded part between them. As shown, in FIG. 7C, the adjacent edges of the door and door opening are preferably chamfered so as to provide a stop as the door is swung to a closed position.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for use in suspending an object from a selected location along the length of a flexible line, comprising a thin, relatively rigid body having front and back faces, an upper end, and a lower end from which the object may be suspended, said body having a substantially "U" shaped opening formed therein with legs which extend along opposite sides of a depending tongue, and a flap on the lower end of the tongue which projects from the front face of the body, said tongue being flexible about its upper end, and the side edges of the flap being closer to the adjacent side edges of the opening than the side edges of the tongue thereabove, when said tongue is unstressed, so that said tongue is bent outwardly as the line is forced between said edges and under the flap to a position behind the upper end of the tongue, and then returns to its unstressed conditions, the back face of the upper end of the tongue being substantially coplaner with the back face of the body on opposite sides thereof, to permit the line to be grasped and pulled upwardly from behind the tongue to form a loop above the upper end of the body, the loop then being bent over the upper end and across the front face of the body on opposite sides of the tongue and beneath the flap, so that, as tension is applied to the line, the loop is pulled upwardly behind the tongue, the legs of the openings and the adjacent side edges of the upper end of the tongue being spaced apart sufficiently to permit the line to be pulled upwardly within the legs into a position adjacent the portions of the line initially pulled upwardly behind the tongue wherein the lower end of the body has means spaced from said opening for attaching the object.

2. A device of the character set forth in claim 1, wherein the portions of the front face of the body on opposite sides of the flap are generally flat so that the line may be moved beneath the flap while in a taut condition.

3. A device of the character set forth in claim 1, including means fixedly securing the object to the body.

4. A device of the character set forth in claim 1, wherein the body is sheet metal.

5. A device of the character set forth in claim 1, wherein the body is bent wire.

* * * * *